US008661385B1

(12) United States Patent
Carvalho et al.

(10) Patent No.: US 8,661,385 B1
(45) Date of Patent: Feb. 25, 2014

(54) METHOD AND APPARATUS FOR PERFORMING DELAY ANNOTATION

(75) Inventors: Lyndon Francis Carvalho, Oakville (CA); Chris Wysocki, Toronto (CA); Tim Vanderhoek, Toronto (CA); Adrian Ludwin, Toronto (CA)

(73) Assignee: Altera Corporation, San Jose, CA (US)

( * ) Notice: Subject to any disclaimer, the term of this patent is extended or adjusted under 35 U.S.C. 154(b) by 458 days.

(21) Appl. No.: 11/899,837

(22) Filed: Sep. 7, 2007

(51) Int. Cl.
*G06F 17/50* (2006.01)
(52) U.S. Cl.
USPC .......................................... 716/113; 716/112
(58) Field of Classification Search
USPC .......................... 716/4–6, 106–109
See application file for complete search history.

(56) References Cited

U.S. PATENT DOCUMENTS

| | | | |
|---|---|---|---|
| 6,253,352 B1 * | 6/2001 | Hanriat et al. ..................... | 716/4 |
| 6,286,126 B1 * | 9/2001 | Raghavan et al. ............ | 716/113 |
| 6,496,965 B1 * | 12/2002 | van Ginneken et al. ...... | 716/113 |
| 6,857,110 B1 * | 2/2005 | Rupp et al. ..................... | 716/136 |
| 2004/0021490 A1 * | 2/2004 | Baxter et al. ..................... | 327/165 |
| 2008/0036487 A1 * | 2/2008 | Bradley et al. ................. | 324/765 |
| 2008/0077900 A1 * | 3/2008 | Oh et al. .......................... | 716/11 |

* cited by examiner

*Primary Examiner* — Binh Tat
(74) *Attorney, Agent, or Firm* — L. Cho

(57) ABSTRACT

A method for designing a system on a target device includes performing delay annotation where a first delay associated with a first aspect of the system is determined by a first software thread and a second delay associated with a second aspect of the system is determined by a second software thread and the first and second software threads operate in parallel. Ensuring independence between each aspect of the system will facilitate efficient parallelism (i.e. minimal synchronization) while still maintaining serial equivalency.

31 Claims, 11 Drawing Sheets

US 8,661,385 B1

METHOD AND APPARATUS FOR PERFORMING DELAY ANNOTATION

TECHNICAL FIELD

Embodiments of the present invention relate to tools such as electronic design automation (EDA) tools for designing systems on target devices such as field programmable gate arrays (FPGAs). More specifically, embodiments of the present invention relates to a method and apparatus for performing delay annotation.

BACKGROUND

Logic devices such as FPGAs are used to implement large systems that include million of gates and megabits of embedded memory. The complexity of large systems often requires the use of EDA tools to create and optimize a design for the system onto physical target devices. Among the procedures performed by EDA tools in a computer aided design (CAD) flow are synthesis, mapping, placement, routing, delay annotation, and timing analysis.

Delay annotation may involve performing logic cell delay annotation where delays related to a logic cell are computed based on the configuration and settings of the cell. Delay annotation may also involve performing routing delay annotation where delays related to a routing network (routing connections) are computed based on the structure and configuration of the routing network and the parasitic capacitive loading with respect to other routing networks in a netlist. Routing delay annotation often involves running a modeling program in order to simulate the system design. The delay values computed from delay annotation are used in timing analysis to determine whether a particular design for a system satisfies timing constraints. Because of the large number of logic cells and routing networks on a system design, delay annotation may require a significant amount of time to complete which further impacts the total compilation time of a system design.

SUMMARY

According to an embodiment of the present invention, an electronic design automation tool may utilize a computer system that supports multi-threading to accelerate the delay annotation procedure on a system. The computer system may include multiple processors or one or more processors each having multiple processor cores. For example, a first delay associated with a first aspect of the system may be determined by a first software thread. A second delay associated with a second aspect of the system may be determined by a second software thread, where the first and second software threads operate in parallel. The first delay and the second delay may be delays associated with logic cell delay annotation or routing network delay annotation.

According to an embodiment of the present invention, the configuration of each logic cell is independent of other logic cells by hardware design. Each routing connection may be viewed as being independent from other routing connections by decoupling the parasitic loading from the connectivity of routing connections. According to such an embodiment of the present invention, annotation of each logic cell and each routing connection can be processed in parallel.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
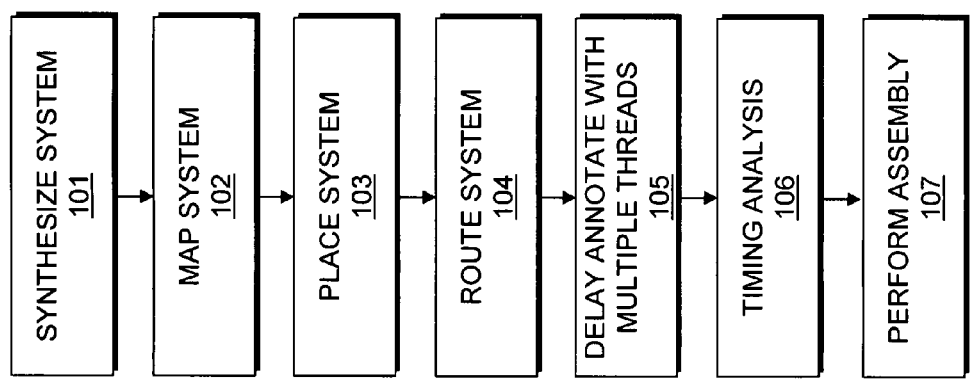
FIG. 1 is a flow chart illustrating a method for designing a system on a target device according to an exemplary embodiment of the present invention.

FIG. 1 is a flow chart illustrating a method for designing a system on a target device according to an embodiment of the present invention. The procedure shown in FIG. 1 may be performed by an EDA tool implemented on a computer system. At 101, the system is synthesized. Synthesis includes generating a logic design of the system to be implemented. The design of the system may be described at a gate level or in a more abstract level. The design of the system may be described in terms of a hardware description language (HDL) such as VHDL or Verilog. The target device may be a structured ASIC, FPGA, programmable logic device (PLD), or other target device. According to an embodiment of the present invention, synthesis generates an optimized logical representation of the system from a HDL design definition. The optimized logical representation of the system may include a representation that has a minimized number of functional blocks such as logic gates, logic elements, and registers required for the system.

At 102, technology mapping is performed on the optimized logic design. Technology mapping includes determining how to implement logic gates and logic elements in the optimized logic representation with resources available on the target device. The resources available on the target device may be referred to as "cells" or "components" and may include logic-array blocks, registers, memories, digital signal processing blocks, input output elements, and other components.

According to an embodiment of the present invention, a netlist is generated from mapping. This netlist may be an optimized technology-mapped netlist generated from the HDL.

At 103, the mapped logical system design is placed. Placement works on the optimized technology-mapped netlist to produce a placement for each of the functional blocks. According to an embodiment of the present invention, placement includes fitting the system on the target device by determining which resources available on the target device are to be used for specific function blocks in the optimized technology-mapped netlist. According to an embodiment of the present invention, placement may include clustering which involves grouping logic elements together to form the logic clusters present on the target device.

At 104, it is determined which routing resources should be used to connect the components in the target device implementing the functional blocks of the system. During routing, routing resources on the target device are allocated to provide interconnections between logic gates, logic elements, and other components on the target device. The routing procedure may be performed by a router in an EDA tool that utilizes routing algorithms.

At 105, delay annotation is performed. According to an embodiment of the present invention, delay annotation involves performing logic cell delay annotation and routing delay annotation. Logic cell delay annotation is a procedure where delays related to a cell (component) are computed based on the configuration and settings of the cell. Logic cell delay annotation may involve referencing a table that includes delay information for various types of cells. Routing delay annotation is a procedure where delays related to a routing network are computed based on the structure and configuration of the routing network with respect to other routing networks on a netlist. A routing network delay may be computed based on the connectivity of its routing elements and the parasitic capacitive loading from other routing networks in the routing netlist. Routing delay annotation may involve running a modeling program in order to simulate the system design. According to an embodiment of the present invention, a description of the specific configurations and operating conditions of a routing element including its fanout, and its input wave form are provided to the modeling program. The modeling program computes the delay through the resource and an output waveform from the resource.

According to an embodiment of the present invention, a computer system that supports multiple software threads may be used to perform one or more of the procedures illustrated in FIG. 1, such as delay annotation. The software thread may refer to a thread of execution where multiple threads may be executed in parallel. The computer system may include multiple processors or multiple cores where different threads may run simultaneously on different processors or cores.

In this embodiment, delay annotation of logic cells may be multi-threaded and performed in parallel. Delay annotation of each logic cell in a system design is independent of other logic cell in a netlist. The order in which delay annotation is performed on logic cells is independent of whether delay annotation has been performed on other logic cells since the annotated delays are based only on the configuration of the logic cell being processed. Furthermore, the delay values of logic cells are pre-determined and read from a preloaded database.

In this embodiment, delay annotation of routing networks may also be multi-threaded and performed in parallel. Delay annotation of each routing network in a system design is independent of other routing networks in a system design in that each routing network includes all the information required to compute its delay. Parasitic capacitive loading may be added onto the routing network. To further expedite subsequent computation of delay of routing networks, an interpolation cache may be implemented to store a fixed set of grid points. Each grid point represents a delay value of a routing element given one or more specific configurations and operating conditions. One or more of the grid points may be used to interpolate a delay value for a routing element in a routing network that has specific configurations and operating conditions similar to the one or more grid points.

At 106, a timing analysis is performed. According to an embodiment of the present invention, timing analysis utilizes the information computed by delay annotation to determine whether the placement and routing performed on the system design satisfies timing constraints of the system.

At 107, an assembly procedure is performed. The assembly procedure involves creating a data file that includes some of the information determined by the procedure described by 101-106. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

Figure 2:
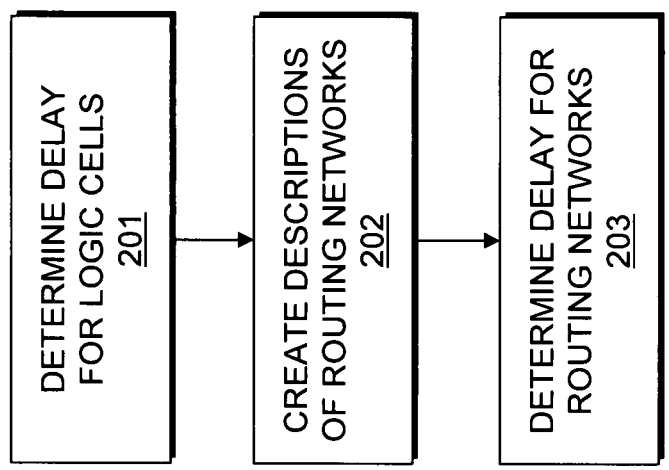
FIG. 2 is a flow chart illustrating delay annotation according to an embodiment of the present invention.

FIG. 2 is a flow chart illustrating delay annotation according to an embodiment of the present invention. The procedure illustrated in FIG. 2 may be used to implement procedure 105 illustrated in FIG. 1. At 201, delays of logic cells are determined. According to an embodiment of the present invention, logic cell delay annotation algorithms annotate the delays of each logic cells in a netlist based on the configuration of each logic cell. Each logic cell configuration may be annotated with a fixed set of delays since each delay in the configuration may be pre-determined before compilation of the system design. The fixed set of delays for each configuration may be based on simulation of the hardware makeup of the logic cell in that configuration. The delays may be stored in a database for read only access during logic cell delay annotation. According to one embodiment of the present invention, the configuration of each logic cell is independent of the configurations of other logic cells in the netlist. As a result, the delay annotation of logic cells may be performed in parallel.

At 202, a delay annotation description for each of the routing networks in the system design is created. The description of the routing networks may be used to compute a delay for a routing network or look up a previously computed delay for the routing network. The creation of each routing network may be done independently from other routing networks in the system design. The structure of each routing network may be based on the connectivity of routing elements that make up the routing network and the parasitic capacitive loading of other routing connections. Parasitic capacitive loading may impact propagation delay and affects the signal integrity on routing elements. Parasitic capacitance stems from interconnecting routing elements though pass-gate multiplexers, which are controlled b$_y$ configuration RAM bits (CRAM).

Figure 3:
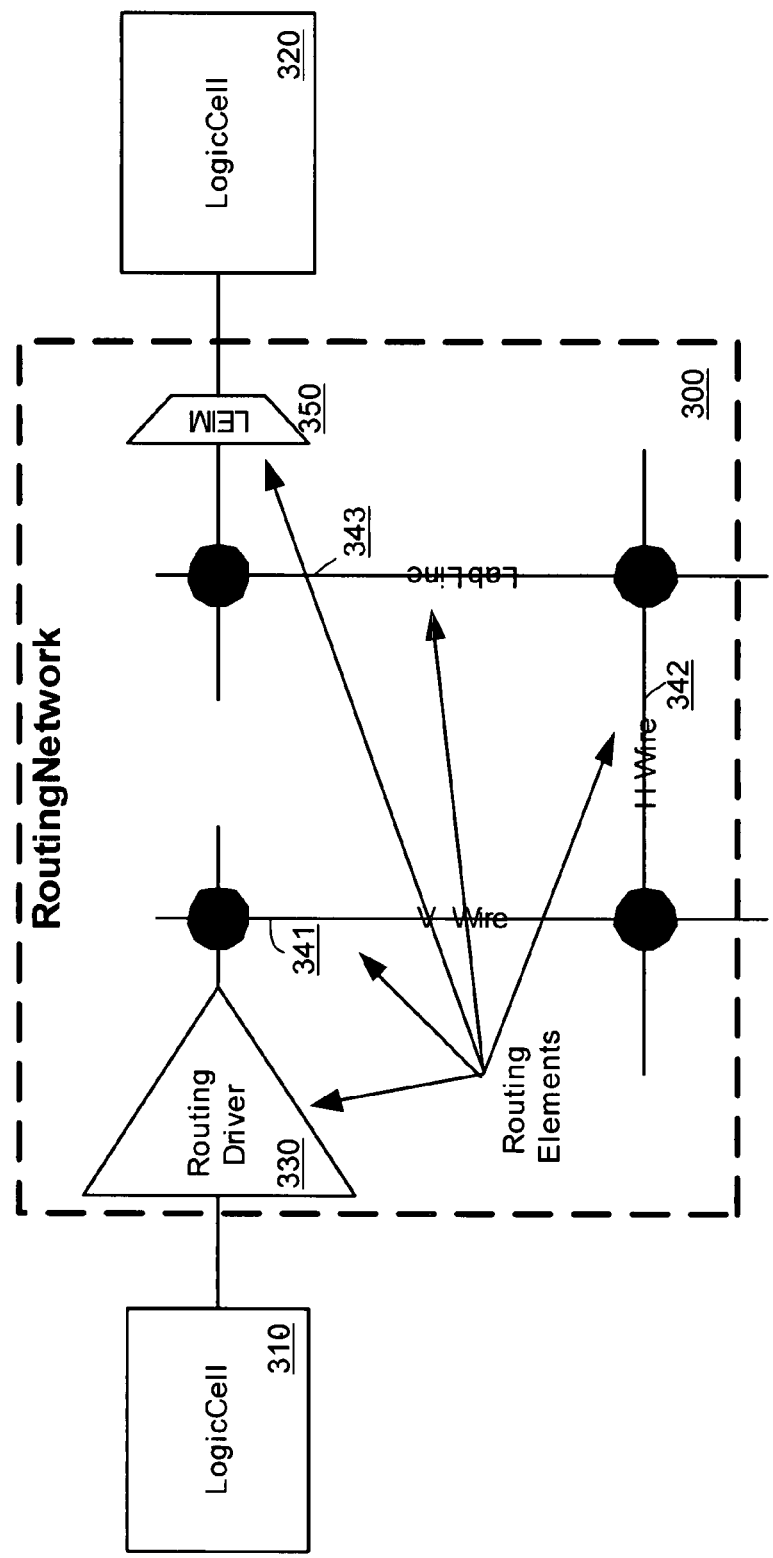
FIG. 3 illustrates an exemplary routing network according to an embodiment of the present invention.

FIG. 3 illustrates an exemplary routing network 300 according to an embodiment of the present invention. The routing network 300 is created after a routing procedure, such as 104 illustrated in FIG. 1. In this example, the routing network 300 connects a first logic cell 310 and a second logic cell 320. The routing network 300 includes a plurality of routing elements such as routing driver 330, V wire 341, H Wire 342, logic array block (LAB) local interconnect line 343, and multiplexer 350.

Figure 4:
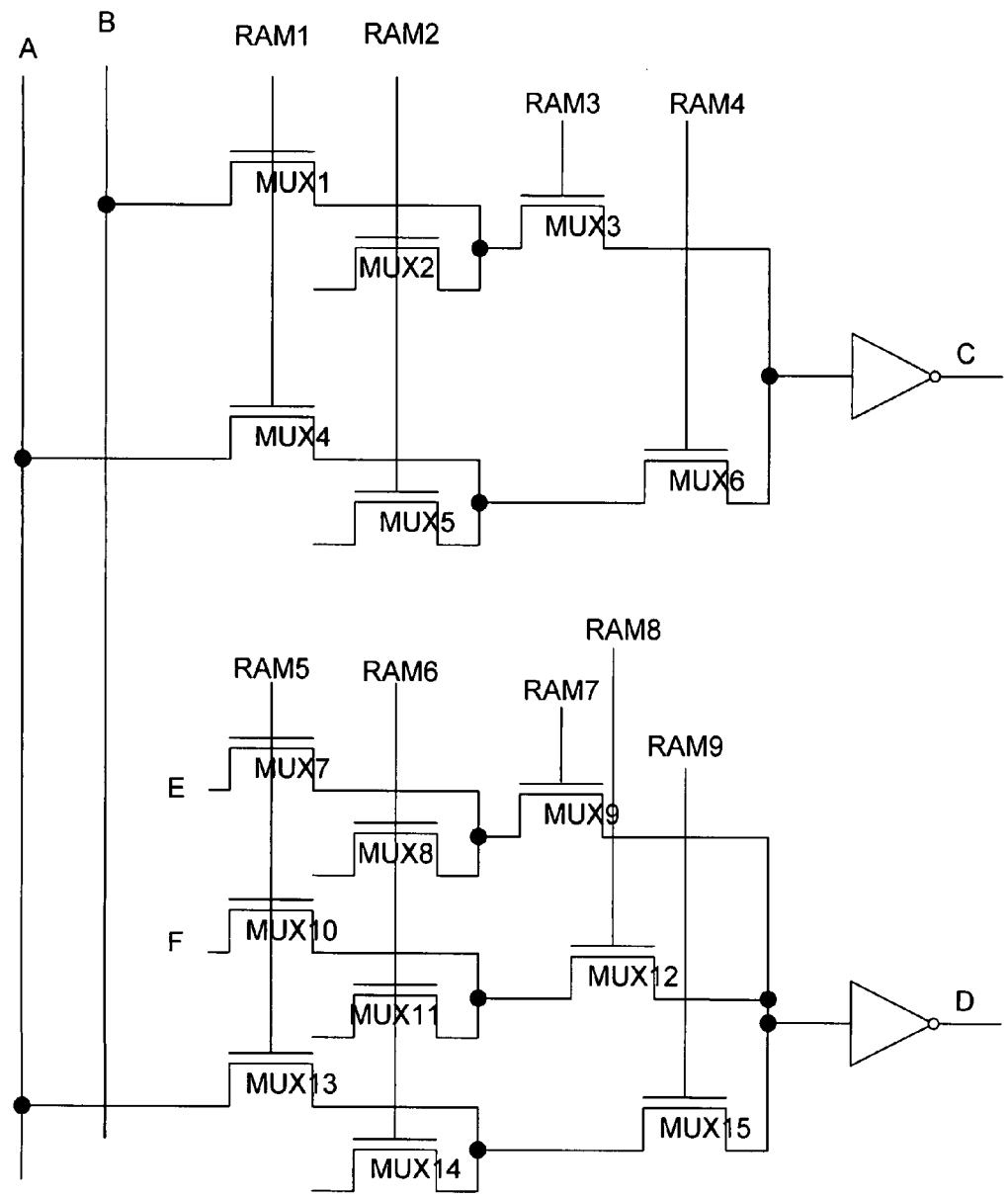
FIG. 4 illustrates an example of parasitic capacitive loading according to an embodiment of the present invention.

FIG. 4 illustrates an example of parasitic capacitive loading according to an embodiment of the present invention. Interdependence among routing connections may be attributed to parasitic capacitive loading. According to one aspect of this embodiment, loading is considered from a two-stage routing multiplexer structure. As illustrated in FIG. 3, to connect from B to C, MUX1 and MUX3 will be turned on by RAM1 and RAM 3. Since MUX1 and MUX4 share RAM1, MUX 4 is also turned on. As a result, A will see additional loading from an ON state of MUX4 and the OFF state of MUX5 and MUX6, illustrating parasitic capacitive loading. Thus, the connection from B to C causes a parasitic capacitive loading effect on unrelated connection A to D. It should be appreciated that although a two-stage routing multiplexer is illustrated, the example may be applied to other multi-staged multiplexers. The RAM used to implement the multiplexer may be a configuration memory bit CRAM, a static RAM (SRAM), or other device. Furthermore, the identifiers A-D may represent nodes, routing connections, or other points or locations in a system design.

Referring back to FIG. 2, at 203, the delay for the routing networks are determined. According to an embodiment of the present invention, the delay for a plurality of routing networks may be computed simultaneously using multiple threads. The routing network may be passed to a simulator for delay computation. The simulator may compute a delay for each routing element in the routing network. The parasitic capacitive loading can be added onto the routing network by reading from the CRAM storage structure as in procedure 605 (shown in FIG. 6). The routing network can then be passed to the simulator for computation. The simulation can proceed on an element by element basis. With this decoupling of parasitic loading into a separate data structure, the configuration of each routing network becomes independent of other routing networks. Each routing network can be computed by the simulator independently because each network holds all the information required by the simulator to compute its delay.

Figure 5:
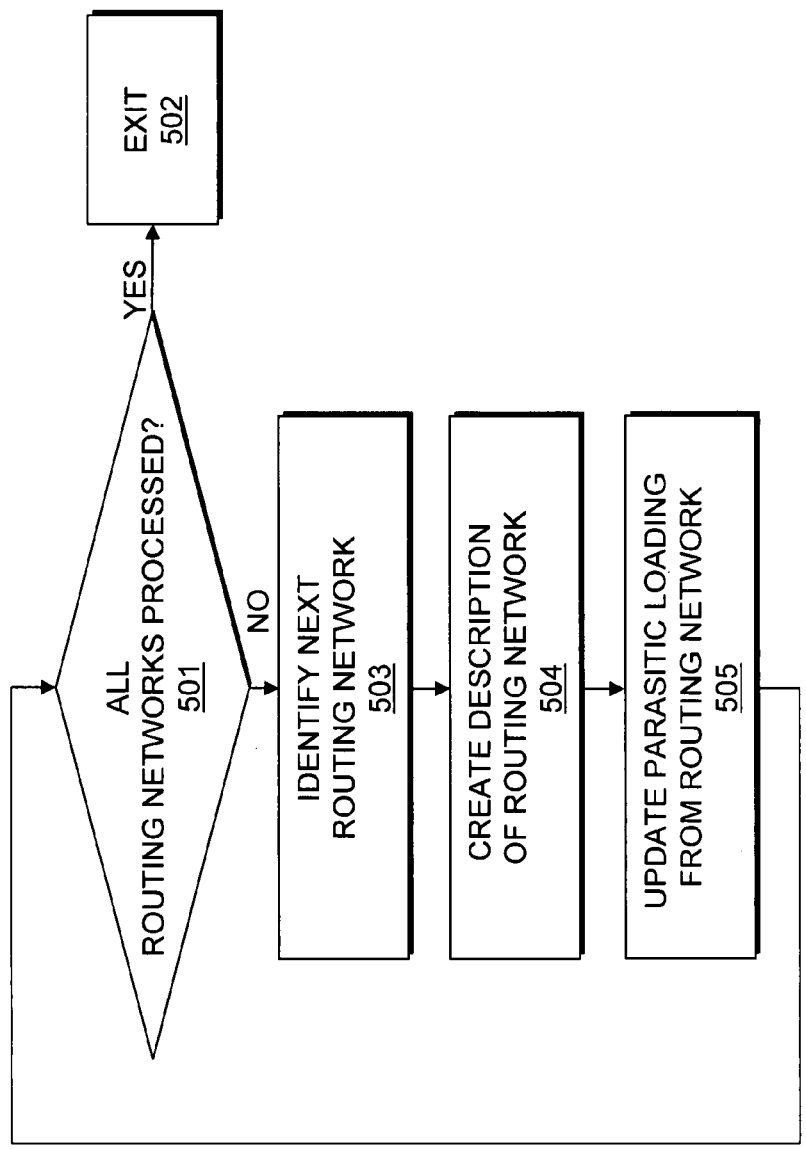
FIG. 5 is a flow chart illustrating a method of creating a delay annotation description of a routing network as performed by a thread according to an embodiment of the present invention

FIG. 5 is a flow chart illustrating a method of creating a delay annotation description of a routing network as performed by a thread according to an embodiment of the present invention. The procedure illustrated in FIG. 5 may be performed by each software thread in a computer system available for delay annotation. By performing multiple instances of the procedure illustrated in FIG. 5 in parallel, more than one routing network may be processed at once. The procedure illustrated in FIG. 5 may be used to implement procedure 202 (shown in FIG. 2) in part.

At 501, it is determined whether all routing networks have been processed. If all routing networks have been processed, control proceeds to 502. If all routing networks have not been processed, control proceeds to 503.

At 502, control terminates the procedure.

At 503, a next routing network is identified. According to an embodiment of the present invention, place and route descriptions of routing networks may be identified from a queue that stores place and route descriptions of all routing networks in a system design. The place and route descriptions of routing networks may be created by a procedure such as 104 (shown in FIG. 1) in part.

At 504, a delay annotation description of the routing network is created from the place and route description.

At 505, the parasitic loading is updated from the place and route description. According to an embodiment of the present invention, the parasitic loading of the routing network is extracted and stored in a separate CRAM storage structure.

According to an embodiment of the present invention, the creation of the description of the routing network connectivity may be performed separately from the creation of the description of the parasitic capacitive loading. Information related to routing network connectivity and parasitic capacitive loading may be stored in separate storage. According to an embodiment of the present invention, creating descriptions of routing networks may be multi-threaded due to the independence between routing networks. Information describing the parasitic capacitive loading for a routing network may be written to a common storage structure that represents the CRAM configuration of the routing. The CRAM storage structure may be created in such a way that sets of bits within a table uniquely correspond to the parasitic capacitance inducing connections of only a single routing network. As a result, each routing network will modify different sections of the table. With this structure, contiguous writes to the table on a routing network by routing network basis may be parallelized without the need for synchronization.

Figure 6:
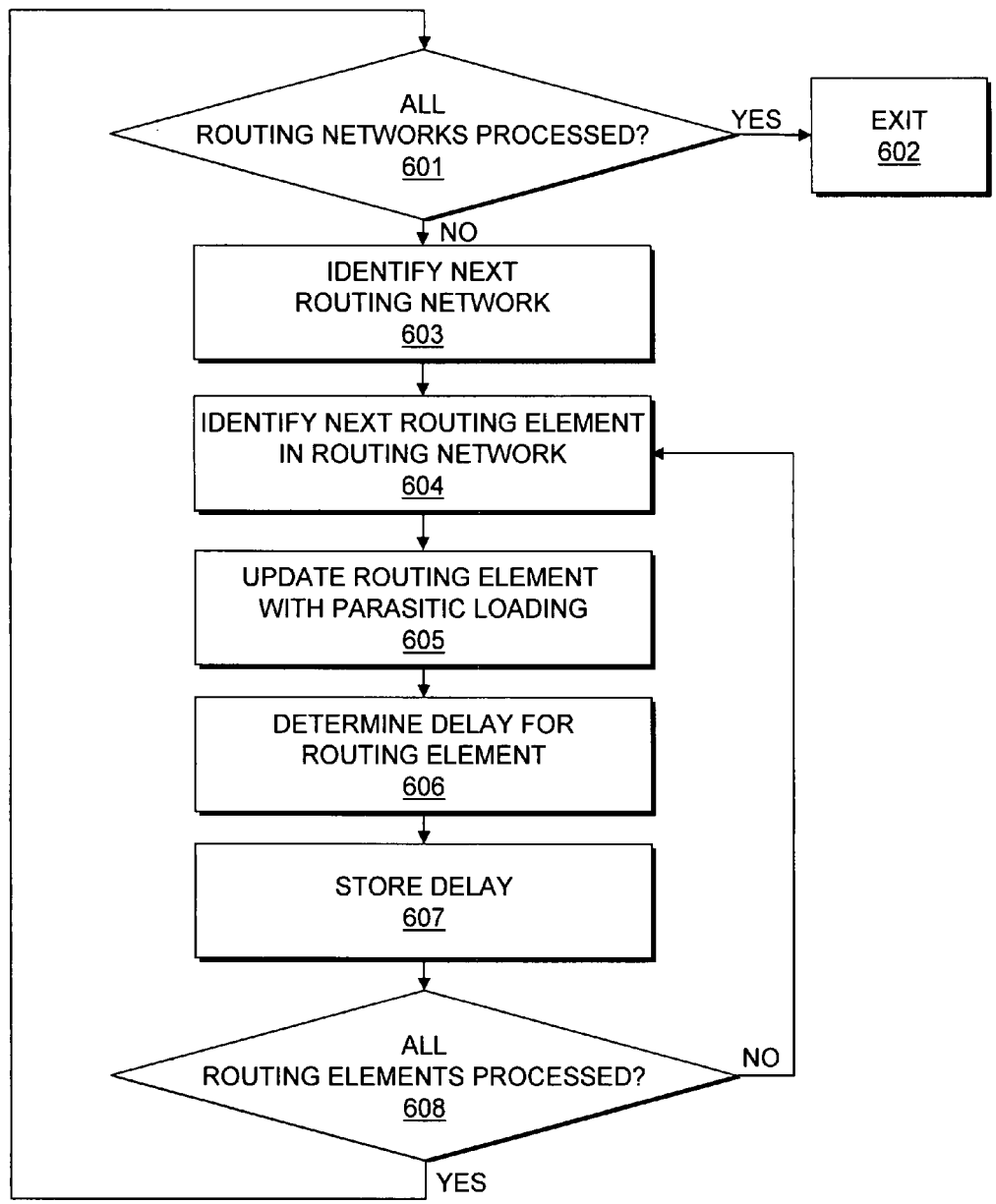
FIG. 6 is a flow chart illustrating a method of computing routing network delay as performed by a thread according to an embodiment of the present invention.

FIG. 6 is a flow chart illustrating a method of computing routing delay as performed by a thread according to an embodiment of the present invention. The procedure illustrated in FIG. 6 may be performed by each software thread in a computer system available for delay annotation. By performing multiple instances of the procedure illustrated in FIG. 6 in parallel, more than one routing network may be processed at once. The procedure illustrated in FIG. 6 may be used to implement procedure 203 (shown in FIG. 2) in part.

At 601, it is determined whether all routing networks have been processed. If all routing networks have been processed, control proceeds to 602. If all routing networks have not been processed, control proceeds to 603.

At 602, control terminates the procedure.

At 603, a next routing network is identified. According to an embodiment of the present invention, delay annotation descriptions of routing networks may be read off of a queue that stores delay annotation descriptions of routing networks in a system design. The delay annotation descriptions of routing networks may be created by a procedure such as 202 (shown in FIG. 2) in part.

At 604, a next routing element from the current routing network is identified. The routing elements may be identified from the description of a routing network. Routing elements may be identified in order of signal propagation.

At 605, the routing element is updated with parasitic loading. According to an embodiment of the present invention, the parasitic loading may be stored in a separate CRAM storage structure as in procedure 504 (shown in FIG. 5).

At 606, a delay for the routing element is determined.

At 607, the delay for the routing element is stored. According to an embodiment of the present invention, the delay may be stored in a separate delay database.

At 608, it is determined whether all routing elements for the current routing network have been processed. If not all of the routing elements for the current routing network have been processed, control returns to 604. If all of the routing elements for the current routing network have been processed, control returns to 601.

According to an embodiment of the present invention, an interpolation cache may be implemented to further speed up the determination of the delay for the routing networks. The interpolation cache stores delay values of a fixed set of grid points, each of which is a result of delay simulation given a specific configuration of a routing resource, such as an electrical or topological description, and operating condition, such as voltage, temperature, manufacturing process, input waveform, or other condition. When a routing element falls into a grid space that does not have fully populated grid points, a simulation unit may be called to populate the grid points and to interpolate the delay. If a routing element falls into a grid space already having fully populated grid points, interpolation may be performed immediately. With interpolation, parallelization may be performed efficiently while still maintaining serial equivalency. According to an embodiment of the present invention, the synchronization overhead of populating the cache with grid points may be mitigated by pre-loading the cache with pre-determined grid points covering portions of the space of routing elements.

Figure 7:
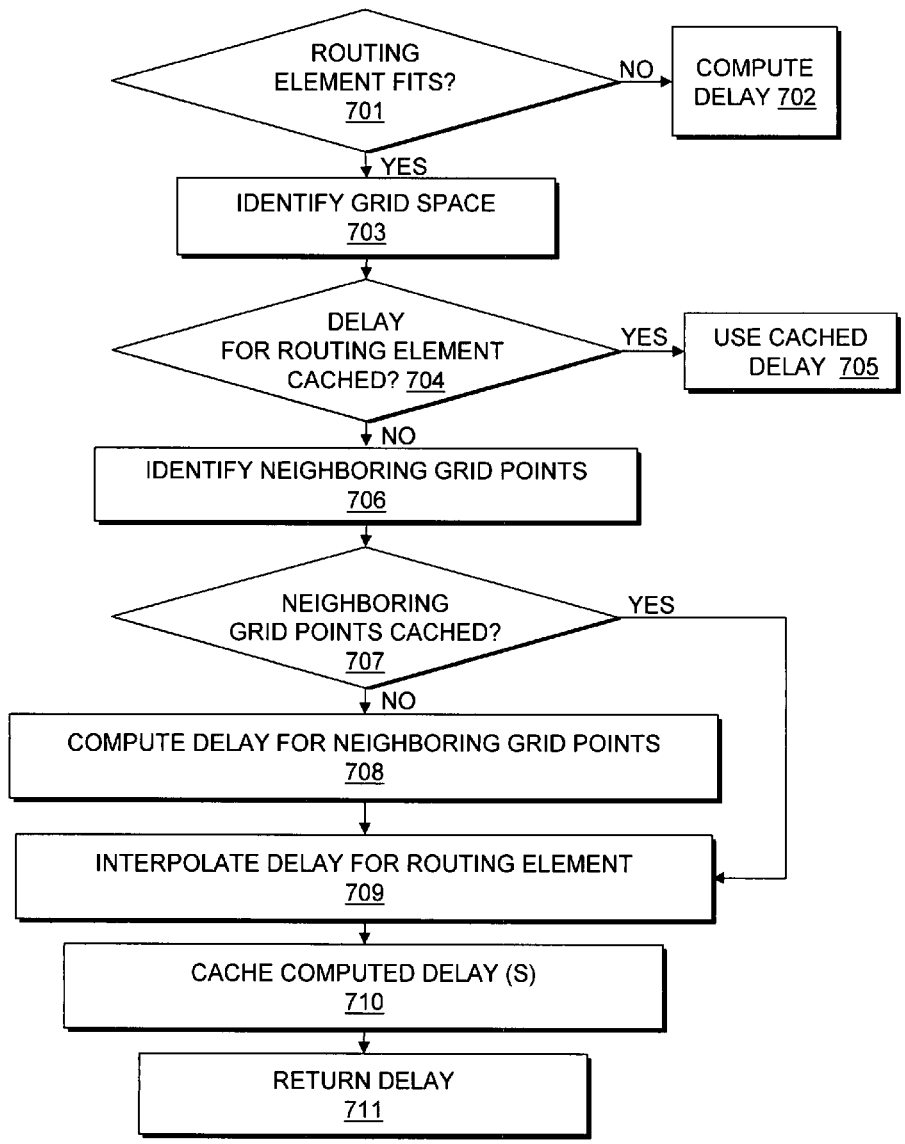
FIG. 7 is a flow chart illustrating delay computation for a routing element according to an exemplary embodiment of the present invention.

FIG. 7 is a flow chart illustrating delay computation for a routing element according to an exemplary embodiment of the present invention. The procedure illustrated in FIG. 7 may be used to implement procedure 606 (shown in FIG. 6).

At 701, it is determined whether a routing element fits in an interpolation cache. An interpolation cache stores a fixed set of grid points. Each grid point represents a delay value of a routing element given one or more specific configurations and operating conditions. According to an embodiment of the present invention, determining whether a routing element fits in an interpolation cache involves making a determination as to whether the cache includes a classification of specific configurations and operating conditions of the routing element. Specific configurations of the routing element may include electrical and topological descriptions. Operating conditions of the routing element may include voltage, temperature, manufacturing process, input waveforms, and other conditions. If the routing element does not fit in the interpolation cache, control proceeds to 702. If the routing element fits in the interpolation cache, control proceeds to 703.

At 702, a delay is computed for the routing element. According to an embodiment of the present invention, a simulator is used to simulate the specific configuration and operating conditions of the routing element to generate the delay for the routing element.

At 703, a grid space for the routing element is identified on the interpolation cache. According to an embodiment of the present invention, the interpolation cache may be represented as a multi-dimensional grid where each classification of specific configurations and operating conditions are represented on an axis in the multi-dimensional grid. The routing element may be converted to an inferred grid point that is mappable onto the multi-dimensional grid.

At 704, it is determined whether a delay for the routing element has been cached. According to an embodiment of the present invention, a delay for the routing element may be cached if it has been previously interpolated and a decision was made to save the delay value. If the delay for the routing element has been cached, control proceeds to 705. If the delay for the routing element has not been cached, control proceeds to 706.

At 705, the cached delay is used for the routing element.

At 706, grid points neighboring the routing element in the grid space are identified.

At 707, it is determined whether the neighboring grid points have delay values that are in the interpolation cache. If not all the neighboring grid points have delay values that are in the interpolation cache, control proceeds to 708. If all of the neighboring grid points have delay values that are in the interpolation cache, control proceeds to 709.

At 708, delays are computed for the neighboring grid points that do not have delay values in the interpolation cache. According to an embodiment of the present invention, a simulator is used to simulate the specific configuration and operating conditions of the grid points to generate the delays.

At 709, a delay for the routing element is interpolated from the neighboring grid points. According to an embodiment of the present invention, interpolation of any routing element falling within the same grid space will always produce the same result. This will result in similar routing elements (i.e. falling in the same grid space) that interpolate to the same delay regardless of the processing order.

At 710, the computed delays are stored in the interpolated cache. According to an embodiment of the present invention, only delays associated with grid points are stored in the interpolation cache. Every delay for each routing element that falls in the same grid space will always be interpolated using the same set of grid points. According to an alternative embodiment of the present invention, interpolated delays of routing elements are also stored in the interpolation cache. The delay for that grid space may be cached and re-used by subsequent routing elements which fall within that same grid space.

At 711, the delay for the routing element is returned.

Figure 8:
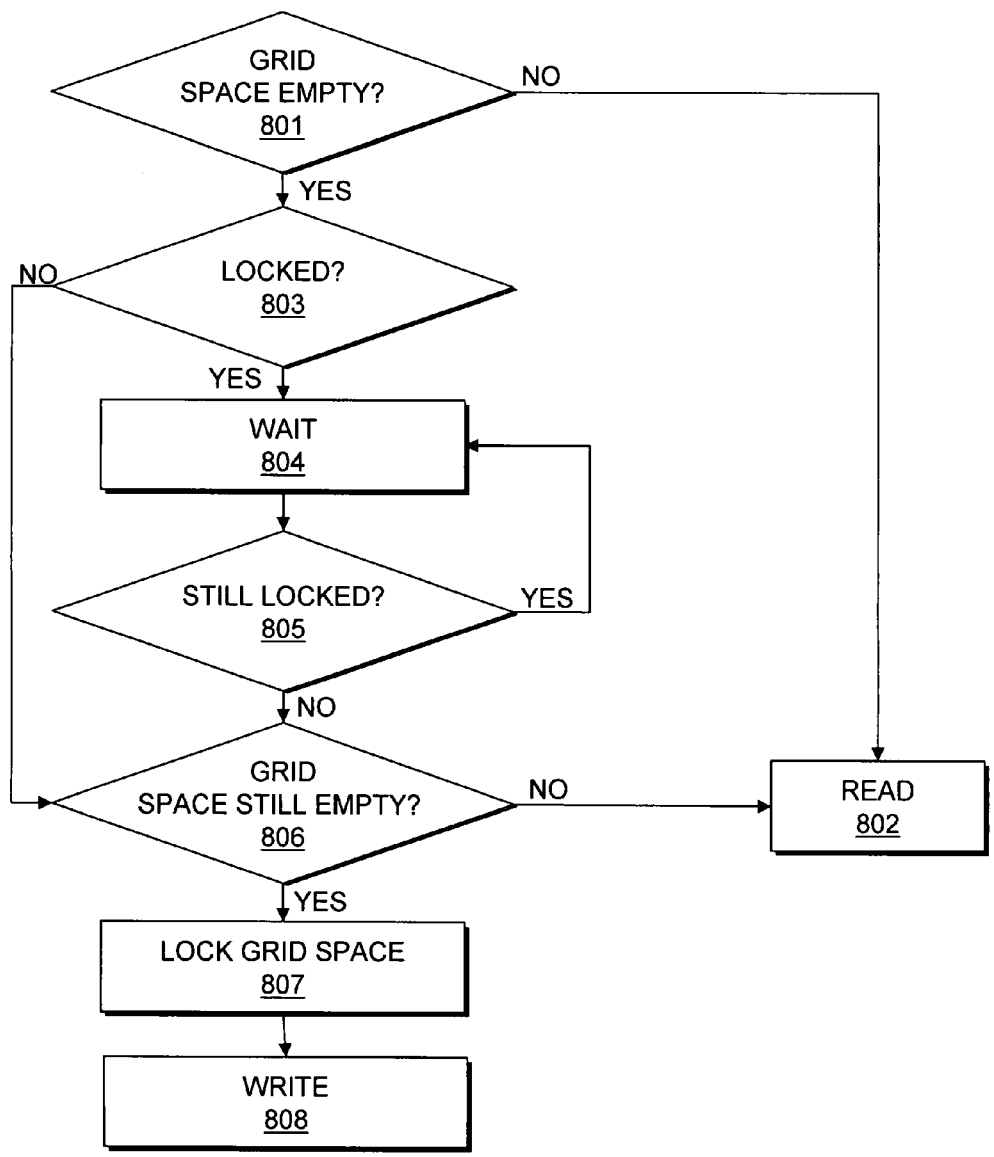
FIG. 8 is a flow chart illustrating a method for synchronization data according to an exemplary embodiment of the present invention.

FIG. 8 is a flow chart illustrating a method for synchronization data according to an exemplary embodiment of the present invention. The procedure illustrated in FIG. 8 may be used to synchronize data in an interpolation cache. According to an embodiment of the present invention, the procedure illustrated in FIG. 8 may be performed when reading and writing from the interpolation cache at 703-711 (shown in FIG. 7).

At 801, it is determined whether a grid space is empty. According to an embodiment of the present invention, a grid space may be empty if a delay for a routing element having a specific configuration and operating condition is not cached. If the grid space is not empty control proceeds to 802. If the grid space is empty, control proceeds to 803.

At 802, the grid space is read. According to one embodiment of the present invention, reading the grid space allows control to use a cached delay.

At 803, it is determined whether the grid space is locked by another thread. The grid space may be locked if another thread is writing to the grid space. If the grid space is locked control proceeds to 704. If the grid space is not locked, control proceeds to 706.

At 804, control waits for a period of time before continuing. According to an embodiment of the present invention, waiting allows the threading locking the grid space to complete its procedure.

At 805, it is determined whether the grid space is still locked. If the grid space is still locked control returns to 804. If the grid space is not locked, control proceeds to 806.

At 806, it is determined whether the grid space is still empty. According to an embodiment of the present invention, the grid space may not be empty if the thread that previously locked the interpolation cache has written a delay value onto the grid space. If the grid space is not empty, control proceeds to 802. If the grid space is still empty, control proceeds to 807.

At 807, the grid space is locked. Locking the grid space prevents other threads from reading or writing to the grid space.

At 808, the grid space is written to. According to an embodiment of the present invention, after an appropriate delay has been computed, the delay value may be written into the grid space by the current thread.

FIGS. 1, 2, and 5-8 are flow charts illustrating methods according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Figure 9:
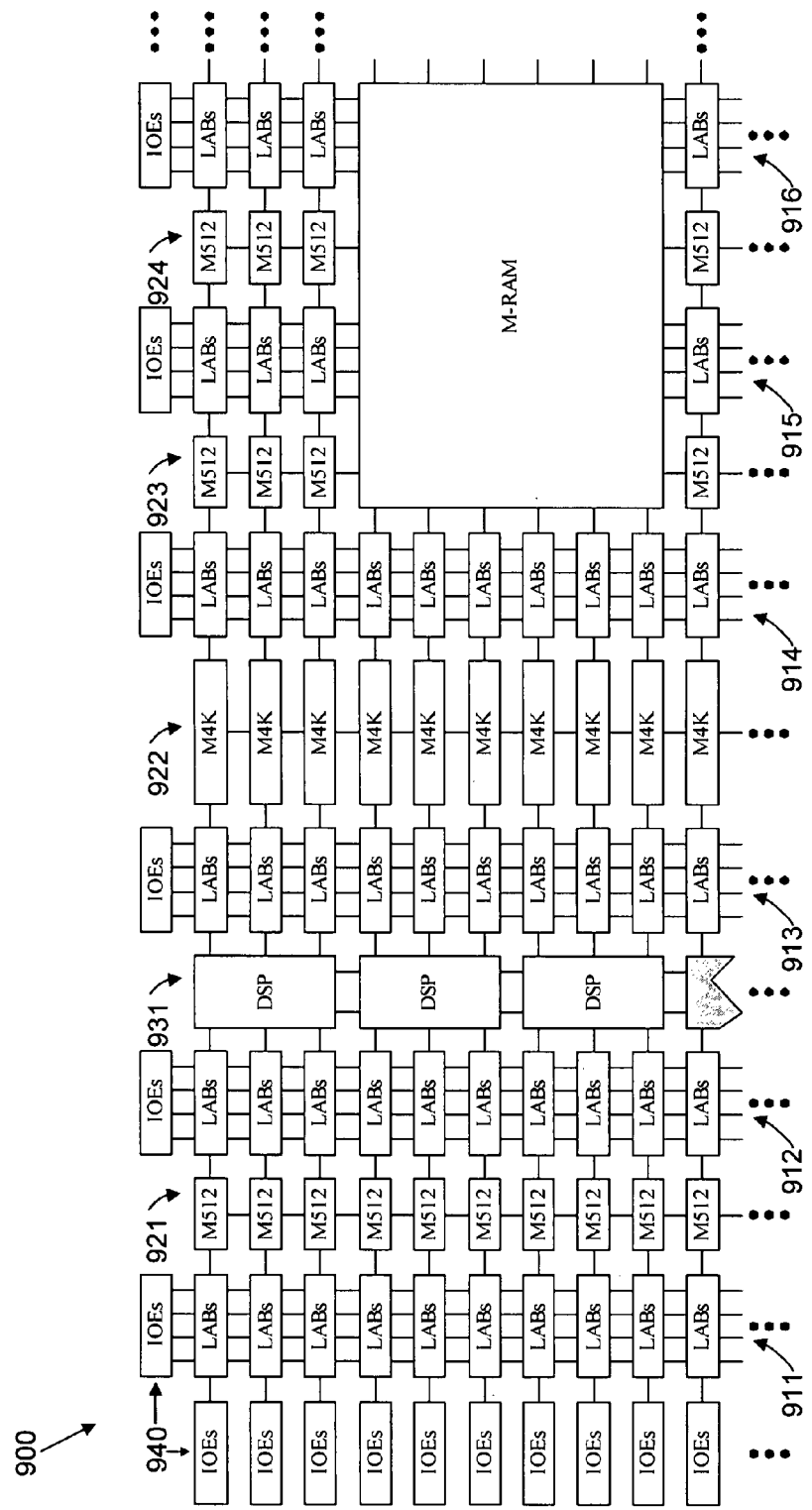
FIG. 9 illustrates an exemplary target device according to an embodiment of the present invention.

FIG. 9 illustrates an exemplary target device 900 in which a system may be implemented on 900 utilizing an FPGA according to an embodiment of the present invention. According to one embodiment, the target device 900 is a chip having a hierarchical structure that may take advantage of wiring locality properties of circuits formed therein. The target device 900 includes a plurality of LABs. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in Stratix™ manufactured by Altera® Corporation, or a combinational logic block (CLB) such as those found in Virtex™ manufactured by Xilinx® Inc. In this embodiment, the logic block may include a four input lookup table (LUT) with a configurable register. According to an alternate embodiment of the present invention, the logic block may operate similarly to an adaptive logic module (ALM), such as those found in Stratix™ II manufactured by Altera® Corporation. LABs are grouped into rows and columns across the target device 900. Columns of LABs are shown as 911-916. It should be appreciated that the logic block may include additional or alternate components.

The target device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 900. Columns of memory blocks are shown as 921-924.

The target device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 900 and are shown as 931.

The target device 900 includes a plurality of input/output elements (IOEs) 940. Each IOE feeds an I/O pin (not shown) on the target device 900. The IOEs are located at the end of LAB rows and columns around the periphery of the target device 900. Each IOE includes a bidirectional I/O buffer and a plurality of registers for registering input, output, and output-enable signals. When used with dedicated clocks, the registers provide performance and interface support with external memory devices.

The target device 900 includes LAB local interconnect lines (not shown) that transfer signals between LEs in the same LAB. The LAB local interconnect lines are driven by column and row interconnects and LE outputs within the same LAB. Neighboring LABs, memory blocks, or DSP blocks may also drive the LAB local interconnect lines through direct link connections.

The target device 900 also includes a plurality of row interconnect lines ("H-type wires") (not shown) that span fixed distances. Dedicated row interconnect lines, route signals to and from LABs, DSP blocks, and memory blocks within the same row. The row interconnect lines may span a distance of up to four, eight, and twenty-four LABs respectively, and are used for fast row connections in a four-LAB, eight-LAB, and twenty-four-LAB. The row interconnects may drive and be driven by LABs, DSP blocks, RAM blocks, and horizontal IOEs.

The target device 900 also includes a plurality of column interconnect lines ("V-type wires") (not shown) that operate similarly to the row interconnect lines. The column interconnect lines vertically routes signals to and from LABs, memory blocks, DSP blocks, and IOEs. Each column of LABs is served by a dedicated column interconnect, which vertically routes signals to and from LABs, memory blocks, DSP blocks, and IOEs. The column interconnect lines may traverse a distance of four, eight, and sixteen blocks respectively, in a vertical direction.

According to an embodiment of the present invention, the cells or components referred to in FIG. 1 may include any of the LABs, memory blocks, DSP blocks, or other resource on the target device 900. Furthermore, the routing connections referred to in FIG. 1 may include any of the LAB local interconnect lines, row interconnect lines, column interconnect lines, or other routing resource on the target device 900. The cells/components and routing connections may collectively be referred to as resources on a target device.

FIG. 9 illustrates an exemplary embodiment of a target device. It should be appreciated that a system may include a plurality of target devices, such as that illustrated in FIG. 9, cascaded together. It should also be appreciated that the target device may include programmable logic devices arranged in a manner different than that on the target device 900. A target device may also include FPGA resources other than those described in reference to the target device 900. Thus, while the invention described herein may be utilized on the architecture described in FIG. 9, it should be appreciated that it may also be utilized on different architectures, such as those employed by Altera® Corporation in its APEX™, Stratix™, Cyclone™, Stratix™ II, Stratix™ III, Cyclone™ II, Cyclone™ III families of chips and those employed by Xilinx® Inc. in its Virtex™, Virtex™ II, Virtex™ II-PRO, Virtex IV™, Virtex V™, and Spartan-3 line of chips.

Figure 10:
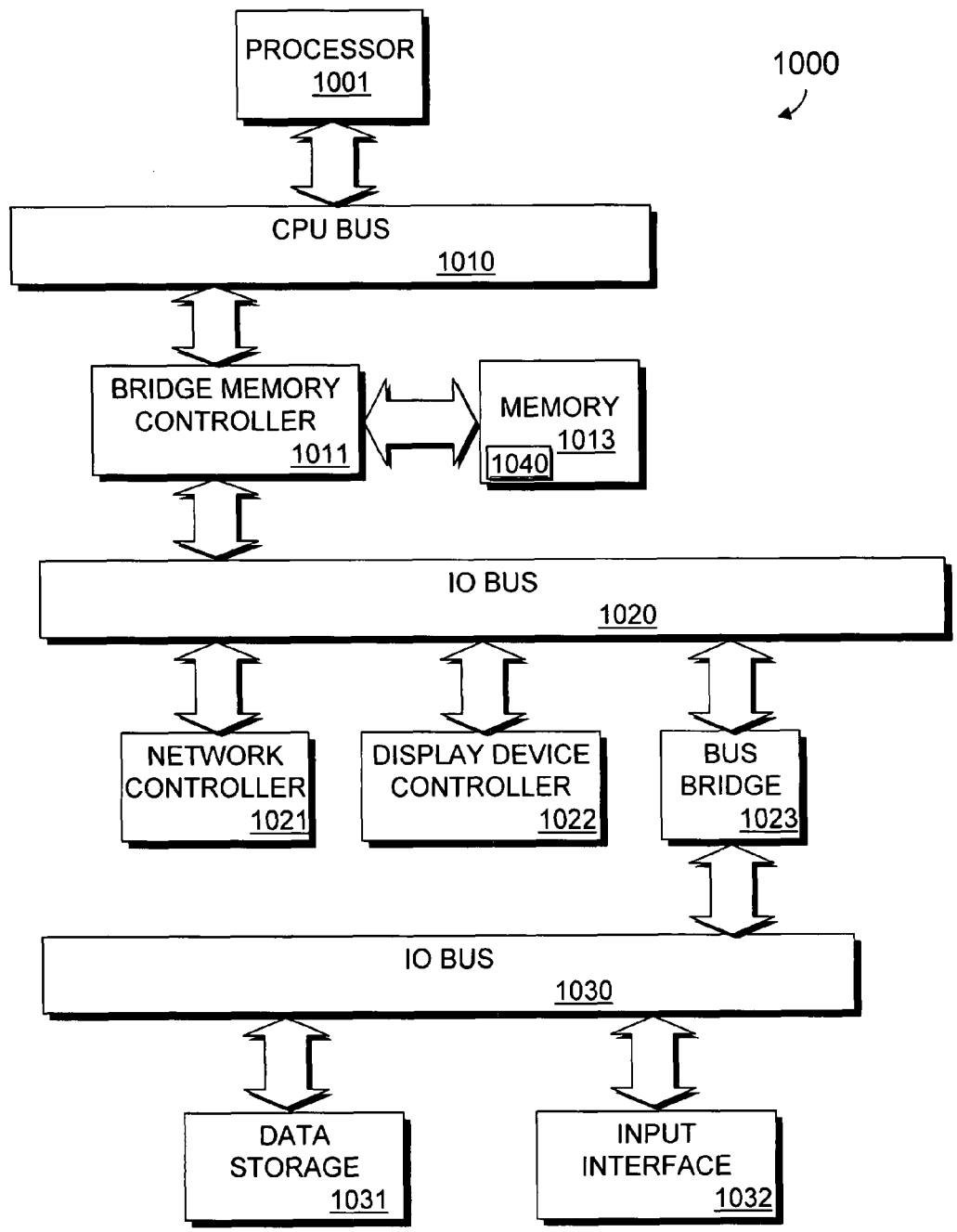
FIG. 10 illustrates an exemplary computer system used to implement the system designer according to an embodiment of the present invention.

FIG. 10 illustrates an exemplary computer system used to implement the system designer according to an embodiment of the present invention. FIG. 10 is a block diagram of an exemplary computer system 1000 in which an example embodiment of the present invention resides. The computer system 1000 may be used to implement a system designer. The computer system 1000 includes a processor 1001 that processes data signals. The processor 1001 is coupled to a CPU bus 1010 that transmits data signals between other components in the computer system 1000.

The computer system 1000 includes a memory 1013. The memory 1013 may be a dynamic random access memory device, a static random access memory device, and/or other memory device. The memory 1013 may store instructions and code represented by data signals that may be executed by the processor 1001. A bridge memory controller 1011 is coupled to the CPU bus 1010 and the memory 1013. The bridge memory controller 1011 directs data signals between the processor 1001, the memory 1013, and other components in the computer system 1000 and bridges the data signals between the CPU bus 1010, the memory 1013, and a first IO bus 1020.

The first IO bus 1020 may be a single bus or a combination of multiple buses. The first IO bus 1020 provides communication links between components in the computer system

1000. A network controller 1021 is coupled to the first IO bus 1020. The network controller 1021 may link the computer system 1000 to a network of computers (not shown) and supports communication among the machines. A display device controller 1022 is coupled to the first IO bus 1020. The display device controller 1022 allows coupling of a display device (not shown) to the computer system 1000 and acts as an interface between the display device and the computer system 1000.

A second IO bus 1030 may be a single bus or a combination of multiple buses. The second IO bus 1030 provides communication links between components in the computer system 1000. A data storage device 1031 is coupled to the second IO bus 1030. The data storage device 1031 may be a hard disk drive, a floppy disk drive, a CD-ROM device, a flash memory device or other mass storage device. An input interface 1032 is coupled to the second IO bus 1030. The input interface 1032 may be, for example, a keyboard and/or mouse controller or other input interface. The input interface 1032 may be a dedicated device or can reside in another device such as a bus controller or other controller. The input interface 1032 allows coupling of an input device to the computer system 1000 and transmits data signals from an input device to the computer system 1000. A bus bridge 1023 couples the first IO bus 1020 to the second IO bus 1030. The bus bridge 1023 operates to buffer and bridge data signals between the first IO bus 1020 and the second IO bus 1030. It should be appreciated that computer systems having a different architecture may also be used to implement the computer system 1000.

According to an embodiment of the present invention, a system designer 1040 may reside in memory 1013 and be executed by the processor 1001. The system designer 1040 may operate to synthesize, map, place and route a system on a target device. The system designer 1040 may also perform delay annotation and incremental delay annotation on a system design after incremental changes have been made to a base system design.

Figure 11:
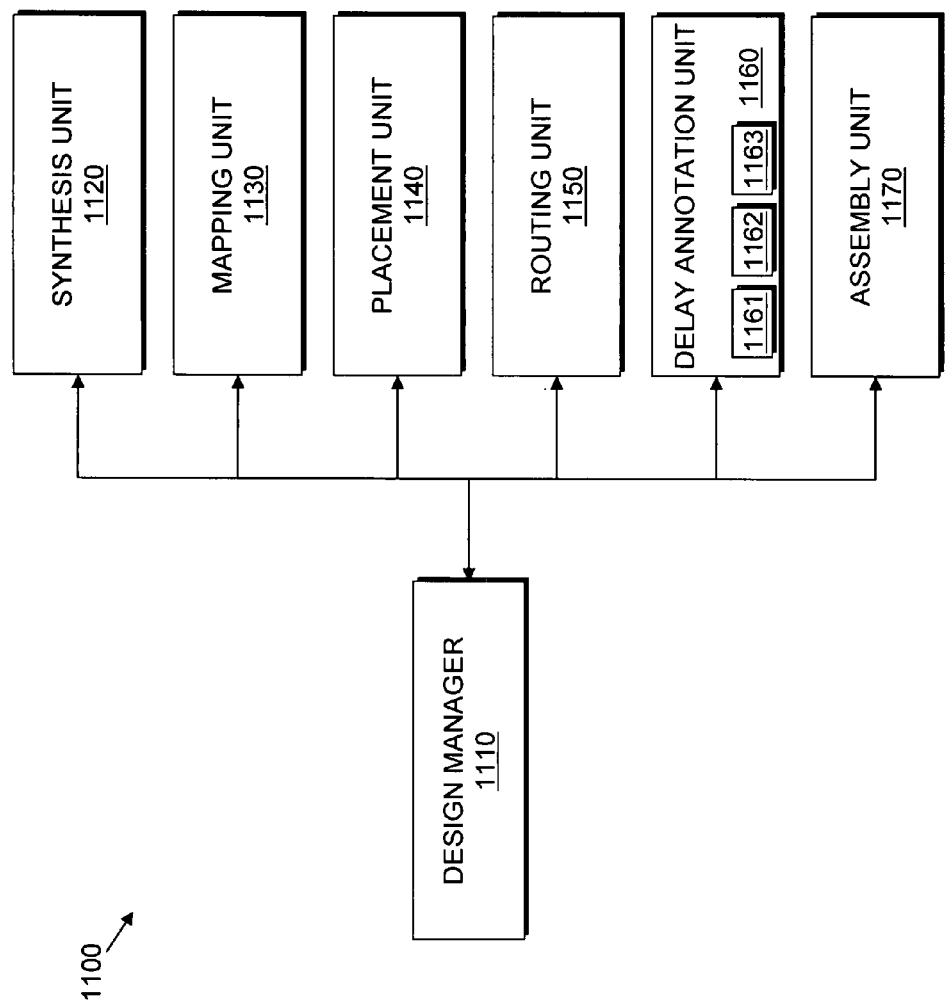
FIG. 11 illustrates a system designer according to an exemplary embodiment of the present invention.

FIG. 11 illustrates a system designer 1100 according to an embodiment of the present invention. The system designer 1100 may be an EDA tool for designing a system on a target device. The target device may be, for example, a structured ASIC, an FPGA, a PLD, or other circuitry. FIG. 11 illustrates software modules implementing an embodiment of the present invention. According to one embodiment, system design may be performed by a computer system executing sequences of instructions represented by the software modules shown in FIG. 11. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 1100 includes a designer manager 1110. The designer manager 1110 receives a design for a system. The design may be described at a gate level or in a more abstract level. The design may be described in terms of an HDL such as VHDL or Verilog. The designer manager 1110 is connected to and transmits data between the components of the system designer 1100.

Block 1120 represents a synthesis unit that performs synthesis. The synthesis unit 1120 generates a logic design of a system to be implemented in the target device. According to an embodiment of the system designer 1100, the synthesis unit 1120 takes a conceptual HDL design definition and generates an optimized logical representation of the system. The optimized logical representation of the system generated by the synthesis unit 1120 may include a representation that has a minimized number of functional blocks and registers, such as logic gates and logic elements, required for the system. Alternatively, the optimized logical representation of the system generated by the synthesis unit 1120 may include a representation that has a reduced depth of logic and that generates a lower signal propagation delay.

Block 1130 represents a technology mapping unit that performs technology mapping. The technology mapping unit 1130 determines how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA or PLD, the technology-mapped netlist may include cells such as LABs, registers, memory blocks, DSP blocks, IO elements or other components.

Block 1140 represents a placement unit that performs placement. The placement unit 1140 processes the optimized technology-mapped netlist to produce a placement for each of the functional blocks. According to an embodiment of the present invention for a target device that is a structured ASIC, the placement unit 1140 fits the system on the target device by determining which components on the logic design are to be used for specific logic elements, and other function blocks.

Block 1150 represents a routing unit that performs routing. The routing unit 1150 determines the routing resources on the target device to use to provide interconnection between the components implementing functional blocks and registers of the logic design.

Block 1160 represents a delay annotation unit that performing logic cell delay annotation and routing delay annotation on a system design. The design manager 1110 may perform timing analysis using the delay information computed by the delay annotation unit 1160. According to an embodiment of the present invention, the delay annotation unit 1160 performs logic cell delay annotation and routing delay annotation. Logic cell delay annotation is a procedure where delays related to a cell (component) are computed based on the configuration and settings of the cell. Logic cell delay annotation may involve referencing a table that includes delay information for various types of cells. Routing delay annotation is a procedure where delays related to a routing network are computed based on the structure and configuration of the routing network with respect to other routing elements on a netlist. The delays may be computed based on parasitic capacitive loading from other routing elements in the routing netlist. The delay annotation unit 1160 includes a simulator 1161 that runs a modeling program to simulate the system design and compute a delay value. According to an embodiment of the present invention, a description of a routing element such as its specific configuration and operating condition are provided to the modeling program. The modeling program computes the delay through the resource and an output waveform from the resource.

According to an embodiment of the present invention, a computer system that supports multiple software threads may be used to perform delay annotation. The software thread may refer to a thread of execution where multiple threads may be executed in parallel. The computer system may include multiple processors or multiple cores where different threads may run simultaneously on different processors or cores. In this embodiment, delay annotation of logic cells may be multi-threaded and performed in parallel. Delay annotation of each logic cell in a system design is independent of other logic cells in a circuit netlist. The order in which delay annotation is performed on logic cells is independent of whether delay annotation has been performed on other logic cells since the annotated delays are based only on the configuration of the logic cell being processed. Furthermore, the delay values of logic cells are pre-determined and read from a preloaded database. In this embodiment, delay annotation of routing networks may also be multi-threaded and performed in parallel. Delay annotation of each routing network in a system design is independent of other routing networks in a system design in that each routing network includes all the information required to compute its delay. Parasitic capacitive loading may be added onto the routing network.

To further expedite subsequent computation of delay of routing networks, an interpolation cache 1162 may be implemented to store a fixed set of grid points. Each grid point represents a delay value of a routing element given one or more specific configurations and operating conditions. The delay annotation unit 1160 further includes an interpolation unit 1163 that may interpolate a delay value for a routing element in a routing network that has specific configurations and operating conditions similar to one or more of the grid points in the interpolation cache. It should be appreciated that the delay annotation unit 1160 may utilize the procedure illustrated in FIG. 5 to generate descriptions of routing networks to be processed, and that the delay annotation unit 1160 may utilize the procedures illustrated in FIGS. 6 and 7 to perform routing delay annotation.

Block 1170 represents an assembly unit that performs an assembly procedure that creates a data file that includes the design of the system generated by the system designer 1100. The data file may be a bit stream that may be used to program the target device. The assembly unit 1170 may output the data file so that the data file may be stored or alternatively transmitted to a separate machine used to program the target device. It should be appreciated that the assembly unit 1170 may also output the design of the system in other forms such as on a display device or other medium.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
   determining a first delay associated with a first aspect of the system, wherein determining the first delay is performed by a first software thread; and
   determining a second delay associated with a second aspect of the system, wherein determining the second delay is performed by a second software thread, wherein the first and second software threads are executed in parallel, and wherein at least one of the determinings is performed by a processor.

2. The method of claim 1, wherein the first aspect and the second aspect of the system relate to cell delay.

3. The method of claim 2, wherein the first and second delays are determined by referencing a table comprising delay information for a plurality of cell types.

4. The method of claim 1, wherein the first aspect and the second aspect of the system relate to routing delays of a first routing network and a second routing network.

5. The method of claim 4, further comprising:
   creating descriptions of the first and the second routing networks of the system; and
   placing each of the first and the second descriptions in a queue for determining an order of routing delay annotation on the first and the second routing networks.

6. The method of claim 4, wherein the first and the second routing networks each includes one or more routing elements between a first and second logic cell.

7. The method of claim 5, wherein creating description of the first and the second routing networks of the system comprises:
   determining routing element connectivity of the first and the second routing networks; and
   describing parasitic capacitive loading of the first and the second routing network.

8. The method of claim 7, wherein describing parasitic capacitive loading of the first and the second routing networks comprises:
   storing and retrieving parasitic capacitive loading information of the first and the second routing networks in a separate configuration random access memory (CRAM) storage structure.

9. The method of claim 4, wherein the first software thread determines a value of the first delay as a delay of a routing element having properties of a routing element in the first routing network if the delay of the routing element has been computed.

10. The method of claim 9, further comprising:
    determining whether properties of the routing element comprise an inferred grid point within an interpolation cache; and
    computing the delay of the routing element by simulating the routing element in response to the properties of the routing element not comprising the inferred grid point.

11. The method of claim 9, further comprising:
    determining whether properties of the routing element comprise an inferred grid point within an interpolation cache; and
    computing the delay of the routing element by computing delays of neighboring grid points by simulation and interpolating a delay of a first routing element from the delays of the neighboring grid points in response to the properties of the routing element comprising the inferred grid point.

12. The method of claim 11, further comprising storing the delays of the neighboring grid points.

13. The method of claim 1, wherein the first aspect of the system relate to cell delay and the second aspect of the system relate to routing delay for a routing network.

14. The method of claim 1, further comprising:
synthesizing the system;
placing the system on the target device; and
routing the system on the target device.

15. The method of claim 1, wherein the first thread is executed on a first processor core and the second thread is executed on a second processor core.

16. A method for designing a system on a target device, comprising:
determining a first delay associated with a first routing network, wherein determining the first delay is performed by a first software thread; and
determining a second delay associated with a second routing network, wherein determining the second delay is performed by a second software thread, wherein the first and second software threads are executed in parallel, and wherein at least one of the determinings is performed by a processor.

17. The method of claim 16, wherein determining the first delay comprises:
converting a routing element in the first routing network to an inferred grid point where properties of the routing element are mappable onto a multi-dimensional grid at the inferred grid point.

18. The method of claim 17, wherein the properties include electrical properties and typological properties.

19. The method of claim 17, further comprising:
identifying neighboring grid points in a grid space of the inferred grid point; and
interpolating a delay value of the routing element from the neighboring grid points on the multi-dimensional grid.

20. The method of claim 17, wherein determining the second delay comprises:
converting a routing element on the second routing network to another inferred grid point where properties of the routing element on the second routing network are mappable onto a multi-dimensional grid.

21. The method of claim 17, wherein the first delay is a delay value of the inferred grid point if the delay value has been computed.

22. The method of claim 16, wherein the first thread is executed on a first processor core and the second thread is executed on a second processor core.

23. An article of manufacture comprising a machine accessible medium including sequences of instructions, the sequences of instructions including instructions which, when executed by the machine, causes the machine to perform a method comprising:
determining a first delay associated with a first aspect of a system, wherein determining the first delay is performed by a first software thread executed on a first processor core; and
determining a second delay associated with a second aspect of the system, wherein determining the second delay is performed by a second software thread executed on a second processor core, wherein the first and second software threads are executed in parallel.

24. A system designer, comprising:
a synthesis unit operable to generate a design for a system;
a mapping unit operable to identify available components on a target device for implementing the design;
a placement unit operable to identify a subset of the available components for assignment to the system;
a routing unit operable to identify routing resources on the target device for coupling the subset of the available components; and
a delay annotation unit operable to determine a first delay associated with a first aspect of the system and a second delay associated with a second aspect of the system, wherein the first and second delays are determined in parallel.

25. The apparatus of claim 24, wherein the first aspect and the second aspect of the system relate to cell delay.

26. The apparatus of claim 24, wherein the first aspect and the second aspect of the system relate to routing delays of a first routing network and a second routing network.

27. The apparatus of claim 24, wherein the delay annotation unit includes an interpolation cache operable to store delays of routing elements having specific configurations and operating conditions.

28. The apparatus of claim 24, wherein the delay annotation unit further includes a simulation unit operable to populate an interpolation cache with delays of routing elements.

29. The apparatus of claim 24, wherein the delay annotation unit further includes an interpolation unit operable to interpolate a delay for a routing element from delays stored in an interpolation cache.

30. The apparatus of claim 24, further comprising a design manager operable to perform timing analysis with delay information from the delay annotation unit.

31. The apparatus of claim 24, wherein the system designer is implemented by a computer system and the first delay is determined by a first thread executed on a first processor core and the second delay is determined by a second thread executed on a second processor core.

* * * * *